United States Patent [19]

Somezawa et al.

[11] 4,368,238

[45] Jan. 11, 1983

[54] MAGNETIC RECORDING MEDIA

[75] Inventors: Masashi Somezawa, Sendai; Yoshinobu Ninomiya, Miyagi; Akira Hashimoto, Tagajyo, all of Japan

[73] Assignee: Sony Corporation, Tokyo, Japan

[21] Appl. No.: 334,255

[22] Filed: Dec. 24, 1981

[30] Foreign Application Priority Data

Dec. 29, 1980 [JP] Japan .................. 55/188035

[51] Int. Cl.³ .............................................. H01F 10/02
[52] U.S. Cl. ...................... 428/413; 428/425.9; 428/482; 428/522; 428/532; 428/694; 428/900
[58] Field of Search ............... 428/413, 425.9, 694, 428/900, 482, 522, 532; 252/62.54

[56] References Cited

U.S. PATENT DOCUMENTS 4,320,171  3/1982  Motz et al. ................... 428/425.9 X Primary Examiner—Bernard D. Pianalto Attorney, Agent, or Firm—Hill, Van Santen, Steadman, Chiara & Simpson

[57] ABSTRACT

The magnetic recording medium contains as a binder a thermoplastic polyurethane resin having a molecular weight larger than about 5,000 and produced by the polyaddition of a long chain diol (A) having a molecular weight ranging from about 500 to 3,000, an organic diisocyanate (C) and a short chain triol (D) having a molecular weight lower than about 500 and specified structures and, as desired, a short chain diol (B) having a molecular weight ranging from about 50 to 500, in specified ratios. The binder may contain a nitrocellulose, a vinyl chloride resin, a polyvinyl butyral, a bisphenol A type polyether or a vinyl chloride-hydroxy carboxylate copolymer as a binder component.

The binder provides particularly enhanced heat resistance and solvent resistance with improved dispersibility of a pigment or the like and other resins and favorable compatibility with a solvent or the like.

54 Claims, 7 Drawing Figures

MAGNETIC RECORDING MEDIA

BACKGROUND OF THE INVENTION

1. Field of the Invention

The present invention relates to a magnetic recording medium and, more particularly, to a magnetic recording medium having a coating layer in which a binder having improved properties is used.

2. Brief Description of the Prior Art

Thermoplastic polyurethane resins containing a terminal hydroxyl group or terminal hydroxyl groups, which may be employed particularly as binders for magnetic tapes or the like are used in the form of a solution in a solvent such as a ketone, e.g., acetone, methyl ethyl ketone, methyl isobutyl ketone or the like; an ester, e.g., ethyl acetate, butyl acetate or the like; an aromatic hydrocarbon, e.g., toluene, isophorone or the like; an alcohol, e.g., isopropyl alcohol or the like; or a mixture thereof. Such thermoplastic polyurethane resins, however, have the drawbacks that the solubility thereof in the solvent as hereinabove referred to becomes poorer in instances where the concentration of urethane groups in the polyurethane resin is rendered high by increasing the ratio of a low molecular weight diol in the resulting polyurethane resin in order to provide enhanced heat resistance and solvent resistance of the resulting thermoplastic polyurethane resin. Accordingly, in this case, the use of a solvent having a strong action to solubilize the polyurethane resin and a high polarity is required. Representatives of such solvents may be enumerated by methyl formamide, tetrahydrofuran or the like. Such solvent, however, may cause the disadvantage that it will corrode surface portions of a base film, a coated object or the like on which a product containing such solvent is brought into contact, whereby wrinkles or crinkles are partially caused or, in some cases, the portions may become dissolved. Therefore, there is a limitation on improvement by increasing the concentration of the urethane groups in the resulting thermoplastic polyurethane resin to be used.

As a process for improving, in particular, heat resistance and solvent resistance of a thermoplatic polyurethane resin, there is known a procedure in which a polyisocyanate such as a commercially available product "Coronate L" (manufactured and sold by Nippon Polyurethane Kogyo K. K.) is added to the thermoplastic polyurethane resin containing a terminal hydroxyl group or terminal hydroxyl groups and then the resulting mixture is subjected to chain prolongation or propagation and crosslinking reactions. In this process, both the hydroxyl groups present at the terminals of the thermoplastic polyurethane resin chain and the urethane bond or bonds present in the molecular chain thereof are allowed to react with the polyisocyanate. In particular, the reaction of the urethane bond with the isocyanate group of the polyisocyanate, which is called a allophanate reaction, that is, the reaction for forming the allophanate bond, requires high temperatures and it cannot provide a sufficient network structure in the resulting polyurethane resin where the resin is used to form a coating.

For binders for magnetic tapes and the like in which an inorganic filler or the like is dispersed or filled therein, workability at the time of coating, such as drying property, recoatability, curing velocity, liquid properties and the like is of great significance, in addition to various physical properties such as durability, adhesion to a base material and the like. On the top of those characteristic properties, thermoplastic polyurethane resins have been demanded to have desirable properties in respect of sedimentation, gloss on the surface of a cured product and the like. In particular, binders for magnetic tapes further require that the thermoplastic polyurethane resin to be used can provide favorable electromagnetic performance and properties resulting from the dispersibility of a pigment in the polyurethane resin. Conventional thermoplastic polyurethane resins, however, have the drawback that their action to disperse a pigment, an inorganic filler or the like is particularly poor so that thermoplastic polyurethane resins having particularly improved dispersion properties have been desired.

As a polyurethane resin possesses a resistance to wear to such an extent as other resins cannot provide, characteristic properties may be expected when such polyurethane resin is blended with the other resins. Conventional thermoplastic polyurethane resins, however, are not satisfactory in compatibility at all with the other resins.

As a method of improving the heat resistance and the solvent resistance of a thermoplastic polyurethane resin, while retaining favorable drying properties and flexibility originating from the polyurethane resin, there is known a method of providing a three-dimensional network structure by subjecting the resin to crosslinking between the polyurethane molecule chains. This method permits the formation of a three-dimensional network structure in the resulting polyurethane resin by adding a curing agent likely to be reactive with a functional group to the thermoplastic polyurethane resin which has at least two functional groups which can be reacted with the curing agent. Such thermoplastic polyurethane resins, however, do not provide the magnetic layer of a magnetic recording medium with sufficient dispersibility of magnetic or magnetizable particles or powders, wear resistance, curability and solvent resistance.

Since the pigment, the inorganic filler or the like to be contained in binders for magnetic tapes or the like has adsorption water and/or chemically bonded water on its surface even when dried to a sufficient extent, consequently it shows a hydrophilic property and compatibility with a compound having a hydroxyl group, a carboxyl group, a sulfone group, a tertiary amino group, a quanternary amino group or the like. As a result, the dispersibility of various binders or the like is improved by adsorption through the aid of those groups.

OBJECTS AND SUMMARY OF THE INVENTION

It is an object of the present invention to provide a magnetic recording medium with a layer containing a thermoplastic polyurethane resin having improved heat resistance and solvent resistance as a binder.

It is another object of the present invention to provide a magnetic recording medium with a layer containing a binder further having improved dispersibility of a pigment, an inorganic filler or the like and compatibility with other resin and a solvent.

It is a further object of the present invention to provide a magnetic recording medium with a layer containing a binder likely to be crosslinked to form a three-dimensional network structure.

In accordance with an aspect of the present invention, a thermoplastic polyurethane resin to be used as a binder is one obtainable by the polyaddition of a long chain diol (A) having a molecular weight ranging from about 500 to 3,000, an organic diisocyanate (C) and a short chain triol (D) having a molecular weight lower than about 500 and structures as represented by formulas as will be described hereinafter and, as desired, a short chain diol (B) having a molecular weight ranging from about 50 to 500, in ratios as will be defined hereinafter.

As a result of extensive research on thermoplastic polyurethane resins, it has been found that the polyaddition reaction of the short chain triol (D) having a specified structure as will be described hereinafter, as one component of the thermoplastic polyurethane resin having a hydroxy group or hydroxyl groups at its terminal or terminals, with the long chain diol and the organic diisocyanate and, as desired, the short chain diol within a specified range can permit a selective reaction to provide a thermoplastic polyurethane resin having a hydroxyl group or hydroxyl groups at its terminal or terminals, which has additionally at least one hydroxyl group in the side chain thereof and, in instances where the nitrogenous short chain triol as will be described hereinafter is used, which has at least one hydroxyl group in the side chain thereof and at least one tertiary amino group in the main chain thereof without causing gellation during manufacture regardless of the use of the triol that has three functional groups as a raw material. The present invention has been accomplished on the basis of this finding that such thermoplastic polyurethane resin can be readily cured with a polyisocyanate or the like and that it can provide improvement in properties that are lacking to a great extent in conventional thermoplastic polyurethane resins. The thermoplastic polyurethane resin according to the present invention possesses a highly enhanced heat resistance and solvent resistance and highly improved dispersibility with a pigment, an inorganic filler and any other additive and favorable compatibility with other resins with the aid of the hydroxyl group or hydroxyl groups present in the side chain thereof and/or the hydroxyl group or groups and the tertiary amino group or groups present in the main chain thereof.

DESCRIPTION OF THE PREFERRED EMBODIMENTS

The thermoplastic polyurethane resin to be used for the magnetic recording medium in accordance with the present invention comprises a combination of units represented by formulas (I):

(a)

(b)

(c)

wherein

W is a residue derived by the elimination of the two hydroxyl groups from a long chain diol (A) having a molecular weight in a range of about 500 to 3,000;

X is a residue derived by the elimination of the two isocyanate groups from an organic isocyanate (C);

Y is a residue derived by the elimination of the two hydroxyl groups from a short chain triol (D) having a molecular weight in a range lower than about 500;

Z is a residue derived by the elimination of the two hydroxyl groups from a short chain diol (B) having a molecular weight in a range of about 50 to 500;

$n_1$ and $n_2$ are each a positive integer; and $n_3$ is 0 or a positive integer; said short chain triol (D) being represented by the formula (II):

or by the formula (III):

wherein $R_1$ is a group represented by the formula:

(where m and n are each an integer from 0 to 6, provided that, when one of m and n is 0, the other is an integer other than 0);

$R_2$ is a group represented by the formula:

(where p and q are each an integer from 0 to 6, provided that, when one of p and q is 0, the other is an integer other than 0);

$R_3$ is a group represented by formula:

(where r is an integer from 0 to 3) or a group represented by formula:

(where r has the same meaning as above); and $R_4$ is a group represented by formula:

(where s is an integer from 0 to 4); obtainable by the polyaddition reaction of the long chain diol (A), the organic diisocyanate (C) and the short chain triol (D) and, as desired, the short chain diol (B) in the ratios of:

$b/a \leq 3$ (i)

$1 < c/(a+b) < 3$ (ii)

$\frac{1}{3} \leq [c-(a+b)]/d < 1$ (iii)

(wherein
a is the molar number of the long chain diol (A);
b is the molar number of the short chain diol (B);
c is the molar number of the organic diisocyanate (C); and
d is the molar number of the short chain triol (D)).

Where the short chain triol (D) used is a triol represented by formula (II), the resulting thermoplastic polyurethane resin is a polymer represented by formula (I) in which not less than one hydroxyl group is present in the side chain thereof. Where the short chain triol (D) used is a triol represented by formula (III) the product is one in which not less than one hydroxyl group is present in the side chain thereof and at the same time not less than one tertiary amino group is present in the main chain thereof. The units as represented by formulas (a), (b) and (c) may be arranged with a certain regularity or in any random manner.

The long chain diol (A) to be employed for the thermoplastic polyurethane resin has a molecular weight in the range from about 500 to 3,000 and may include, for example, a polyester diol, a polyether diol, a polyether ester glycol and the like.

The polyester diol may include, for example, a polyester diol obtainable by the reaction of an aliphatic dicarboxylic acid such as succinic acid, adipic acid, sebacic acid, azelaic acid or the like; an aromatic dicarboxylic acid such as terephthalic acid, isophthalic acid or the like; a lower alcohol ester, such as methyl or ethyl ester, of the carboxylic acid with a glycol such as ethylene glycol, 1,3-propylene glycol, 1,4-butylene glycol, 1,6-hexane glycol, diethylene glycol, neopentyl glycol or the like, an ethylene oxide adduct of bisphenol A or the like or a mixture thereof with a polyester diol of the lactone type obtained by the cleavage polymerization of a lactone such as ε-caprolactone or the like. The polyether diol may include, for example, a polyalkylene ether glycol such as polyethylene glycol, polypropylene ether glycol, polytetramethylene ether glycol or the like, and a polyether glycol obtainable by the copolymerization of these glycols. The polyether ester glycol may include, for example, a polyester ether glycol obtainable by the reaction of the aforesaid polyalkylene ether glycol with an aliphatic or aromatic dicarboxylic acid as hereinabove enumerated as the polyol component.

Where the long chain diol having a too small molecular weight is used, the resulting thermoplastic polyurethane resin will give rise to a decrease in flexibility because the concentration of the urethane groups is rendered too large so that, although ratios thereto of the other components are necessary to be taken into consideration, the solubility of the polyurethane resin in a solvent is rendered generally low to such an extent to which the resin cannot become a solution. Where the long chain diol having a too large molecular weight is used, the concentration of the urethane groups in the resulting polyurethane resin is rendered so small because the content of the long chain diol in the resin becomes too large that the anti-wear property characteristic of the urethane resin is decreased with lack in elastomeric property.

The short chain diol (B) to be optionally used for the thermoplastic polyurethane resin has a molecular weight in the range from about 50 to 500 and may include, for example, an aliphatic glycol such as ethylene glycol, propylene glycol, 1,4-butylene glycol, 1,6-hexane glycol, neopentyl glycol or the like or an aromatic diol such as ethylene oxide adduct or propylene oxide adduct of bisphenol A, ethylene oxide adduct of hydroquinone or the like. The short chain diol (B) may be used singly or in admixture with each other. The employment of the short chain diol (B) can provide desired properties on the resulting thermoplastic polyurethane resin to a greater extent when employed in the ratios as specified hereinabove.

The organic diisocyanate (C) to be used for the thermoplastic polyurethane resin may include, for example, an aliphatic diisocyanate, an aromatic diisocyanate or an alicyclic diisocyanate such as hexamethylene diisocyanate, isophorone diisocyanate, dicyclohexylmethane diisocyanate, methylcyclohexane diisocyanate, tolylene diisocyanate, 4,4'-diphenylmethane diisocyanate, ditolylene diisocyanate, paraxylene diisocyanate, naphthalene diisocyanate, dianisidine diisocyanate, xylylene diisocyanate or the like. The diisocyanates (C) may be employed singly or in admixture with each other.

The short chain triol (D) to be used for the thermoplastic polyurethane resin has a molecular weight in the range lower than about 500 and, more specifically, may be a compound represented by formula (II) or (III) as set forth hereinabove. Specifically, the triol represented by formula (II) may be enumerated, for example, by the following compounds:

| | |
|---|---|
| HO—CH$_2$—CH(OH)—CH$_2$OH | glycerine |
| HOCH$_2$CH$_2$OCH$_2$—CH(OH)—CH$_2$OCH$_2$CH$_2$OH | ethylene oxide adduct of glycerine |
| HOC$_2$H$_4$OCH$_2$—CH(OH)—CH$_2$OC$_2$H$_4$OC$_2$H$_4$OH | ethylene oxide adduct of glycerine |
| HOCH$_2$—C(CH$_3$) (OH)—CH$_2$OH | 2-methyl-propane-1,2,3-triol |
| (OHC$_2$H$_4$)$_2$=C(CH$_3$)—CH$_2$CH(OH)CH$_3$ | 4-[bis(2-hydroxyethyl)]-2-hydroxypentane |
| (HOC$_2$H$_4$)$_2$=C(OH)—CH$_3$ | 3-methylpentane-1,3,5- |

-continued

| | |
|---|---|
| HOCH$_2$—CH(OH)—C$_4$H$_8$OH | triol 1,2,6-hexanetriol |

As the triols represented by formula (III), there may be enumerated by the following compounds:

| | |
|---|---|
| (HOC$_2$H$_4$)$_2$=N—CH$_2$—CH(OH)—CH$_3$ | 1-bis(2-hydroxylethyl)-amino-2-propanol (N—isopropanol diethanolamine) |
| (HOC$_2$H$_4$)$_2$=N—CH$_2$CH(CH$_3$)OCH$_2$CH(OH)CH$_3$ | propylene oxide adduct of diethanolamine |
| (HOC$_2$H$_4$OC$_2$H$_4$)$_2$=N—CH$_2$CH(OH)CH$_3$ | ethylene oxide adduct of N—isopropanoldiethanolamine |

It is preferred to use the short chain triol (D) containing at least one tertiary amino group represented by formula (III) because these triols have each two primary hydroxyl groups which are substantially equivalent in reactivity with the isocyanate group and one secondary hydroxyl group which is lower in reactivity therewith. This is because the tertiary amino group has a catalytic action on urethanation so that, where the thermoplastic polyurethane resin is prepared using the triol as hereinabove enumerated as a chain prolonging agent by the prepolymer method as will be described in detail hereinafter, the chain prolongation reaction proceeds advantageously and dispersibility of a pigment, inorganic filler or the like in the resulting polyurethane resin is remarkably improved because both the tertiary amino group present in the main chain of the polymer and the hydroxyl groups present at positions apart through several carbon atoms therefrom act on the identical particle of the pigment, inorganic filler or the like, whereby adsorbability is enhanced more than where either one of the hydroxyl group and the tertiary amino group is present in the main chain by virtue of a selective adsorbability of the polyurethane resin on the pigment or the like. It is also preferable to use the triol of formula (III) as having the tertiary amino group because the tertiary amino group can act as a catalyst for the urethanation reaction where the polyurethane resin is converted into a three-dimensional network structure by adding thereto a curing agent such as a polyisocyanate.

Mention will be made of the method of preparing the thermoplastic polyurethane resin to be used for the magnetic recording medium in accordance with the present invention.

The thermoplastic polyurethane resin may be prepared by subjecting the long chain diol (A), the short chain triol (D) and the organic diisocyanate (C) and, optionally, the short chain diol (B) to the polyaddition reaction in ratios as follows:

$$b/a \leqq 3 \qquad \text{(i)}$$

$$1 < c/(a+b) < 3 \qquad \text{(ii)}$$

$$\tfrac{1}{2} \leqq [c-(a+b)]/d < 1 \qquad \text{(iii)}$$

(wherein a, b and c have each the same meaning as above).

The polyaddition may be carried out by a known method: for example, a one-shot method in which all the components are simultaneously reacted with each other; a prepolymer I method in which a mixture of the long chain diol (A) with the short chain diol (B) is previously reacted with the organic diisocyanate (C) to give a prepolymer having an isocyanate group or isocyanate groups at its terminal or terminals and the short chain triol (D) is added thereto so as to permit chain prolongation and introduction of the hydroxyl group or hydroxyl groups at the side chain thereof; and a prepolymer II method in which the long chain diol (A) is reacted with the organic diisocyanate (C) to give a prepolymer having an isocyanate group or isocyanate groups at the terminal or terminals thereof and the resulting prepolymer is then reacted with a mixture of the short chain diol (B) with the short chain triol (D) so as to permit chain prolongation and introduction of a hydroxyl group or hydroxyl groups into the side chain thereof.

The b/a ratio being equal to and not larger than 3 as indicated by item (i) above means that the molar ratio of the short chain diol (B) to the long chain diol (A) is not greater than 3. Where the b/a ratio is too large, the urethane concentration in the resulting polyurethane resin becomes so high that the resin may be dissolved in a solvent such as ethyl acetate, methyl ethyl ketone, toluene or the like. Accordingly, such polyurethane resin is inappropriate for magnetic tapes and so on. Where there is used a straight chain diol such as ethylene glycol, 1,4-butylene glycol, 1,6-hexane diol or the like as the short chain diol, it is preferred to adjust the b/a ratio in the range not larger than 1, more preferably not larger than 0.5. Where a branched chain short chain diol such as neopentyl glycol or ethylene oxide adduct or propylene oxide adduct of bisphenol A is used, the dissolubility of the urethane resin is improved so that the b/a ratio can be rendered higher than the straight chain diol. Where the b/a ratio exceeds much higher than 3, it is not preferred because the dissolubility of the resin is impaired.

The ratio as described in item (ii) above relates to the prepolymer composition having the isocyanate group or isocynate groups at the terminal or terminals thereof to be prepared by the prepolymer I method and, more specifically, means that the molar ratio of the organic diisocyanate (C) to the sum of the long chain diol (A) and the short chain diol (B) is larger than 1 and smaller than 3. Where the molar ratio is not larger than 1, the short chain triol (D) cannot be introduced owing to the relationship of the ratio (iii) above. Where the molar ratio (ii) above is larger than 3, it is not preferred that what is generally called a free diisocyanate content, that is, the amount of the organic diisocyanate (C) which remains unreacted, is rendered too large due to the high isocyanate concentration in the prepolymer obtainable by the prepolymer I method. This is also undesirable because it becomes extremely difficult to control the chain prolongation reaction for the introduction of the hydroxyl group or hydroxy groups into the side chain thereof because a reaction with the short chain triol proceeds too rapidly due to a great amount of the short chain triol (D). This is further undesirable because a product where network portions and/or insoluble portions are partially formed may result in accordance with reaction conditions. In particular, where the one-shot method is used, the ratio of the secondary hydroxyl groups belonging to the short chain triol to the other hydroxyl groups in the resulting polyurethane resin is rendered so large that the concentration of such secondary hydroxyl groups becomes relatively great and consequently the relative velocity represented by the product of the reaction velocity constant and the concentration of the mixture used therefor is rendered close in accordance with a reaction probability so that the secondary hydroxyl groups of the short chain triol (D) to be introduced into the side chain thereof are also consumed for a reaction with the isocyanate group, whereby polymerization in a straight linear manner is rendered difficult. The ratio is preferably in the range from about 1.02 to 2.5, more preferably from about 1.05 to 2.0.

The ratio (iii) above means that the molar ratio of the prepolymer having a isocyanate group or isocyanate groups at the terminal or terminals thereof prepared previously by the prepolymer I method to the short chain triol (D) to be used as an component for chain prolongation, that is to say, the ratio of the isocyanate group (NCO) present at the both terminals of the prepolymer to the primary hydroxyl groups of the triol, is not smaller than $\frac{1}{2}$ and not larger than 1, assuming that the secondary hydroxyl group of the short chain triol (D) is regarded as not involved in the reaction.

In Table 1 below, the hydroxyl group represented by $\gamma = NCO/OH$, on the one hand, represents the concentration of two hydroxyl groups excluding the secondary hydroxyl group in the short chain triol (D), and the NCO group represented by $\gamma = NCO/OH$, on the other hand, represents the concentration of the isocyanate groups at the both terminals of the prepolymer prepared by the prepolymer I method. That is to say, the following relationship can be given: $\gamma = [c-(a+b)]/d = NCO/OH$.

TABLE 1

| Relationship of $\gamma$ with Structure of Polyurethane Resin (Prepolymer I method) | | |
|---|---|---|
| $\gamma$ | P* | n** |
| 0.50 | 1 | 2 |
| $\frac{2}{3}$ (= 0.667) | 2 | 3 |
| 0.75 | 3 | 4 |
| 0.80 | 4 | 5 |
| 0.90 | 9 | 10 |
| 0.95 | 19 | 20 |
| 0.99 | 99 | 100 |

*P = $\gamma/(1 - \gamma)$
**n = number of side chain OH groups

From Table 1 above, $\gamma = 0.5$ means that the resulting polyurethane resin results from a prepolymer having one triol at the both terminals thereof and possesses a hydroxyl group at each of the terminals thereof and a hydroxyl group or hyddroxyl groups at the side chain or chains thereof, that is, the side chain hydroxyl groups. Preferably, $\gamma$ is in a range not smaller than $\frac{2}{3}$, and a side chain hydroxyl group or groups is or are introduced into the middle portion of the molecular chain so that the crosslinking is effected even at the middle portion thereof rather than the crosslinking merely at the terminals, in instances where it is cured with a curing agent, whereby heat resistance and solvent resistance are increased to a remarkably high extent. More preferably, $\gamma$ is in a range from 0.80 to 0.99, and not fewer than five side chain hydroxyl groups are introduced therein. Where $\gamma$, that is, the ratio (iii) above, is larger than 1, even the secondary hydroxyl group of the short chain triol is also used to allow a reaction so that the resulting polymer gels and cannot provide a linear polymer. Accordingly, it is necessary that the ratio (iii) above is in the range smaller than 1.

The molecular weight of the thermoplastic polyurethane resin necessary to provide properties and effects to be sought to be accomplished in accordance with the present invention may be in a range larger than about 5,000, preferably larger than about 9,000, although it varies with the structure thereof. Where the resulting thermoplastic polyurethane resin has a too small molecular weight, the physical properties become too brittle and the breaking strength thereof is so low that elongation becomes low.

There are ranges for optimum concentrations of the side chain hydroxyl groups and the tertiary amino groups in the resin. Where the optimum concentrations are over the upper limits, the liquid properties of the dispersion are so thixotropic that workability is impaired where a pigment or the like is a vehicle component for a binder in which it is dispersed. Conversely, where the concentrations are below the lower limits, the hydrophilic groups to be adsorbed are rendered too small so that dispersibility becomes as poor as conventional thermoplastic polyurethane resins and a crosslinking density is so low, where it is crosslinked with a curing agent such as polyisocyanate, that a sufficient effect resulting from the crosslinking cannot be given. It is preferred that the concentration ranges be in a range generally from about 0.01 to 1.0 mmol/gram, although they are dependent upon uses and requirement performance.

Processes for the polyaddition reaction to be used for preparing the thermoplastic polyurethane resin may include, for example, a melt polymerization in which the reaction is carried out in a molten state and a solution polymerization in which the reaction is carried out in a solution of the raw materials as referred to hereinabove in an inert solvent such as ethyl acetate, methyl ethyl ketone, acetone, toluene or the like or a mixture thereof. For the manufacture of the thermoplastic polyurethane resins in accordance with the present invention which are employed in a solution in a solvent in many cases, the solution polymerization is preferred. It is particularly preferred that the melt polymerization is carried out during the preparation of the prepolymer and, prior to the chain prolongation reaction, the solution polymerization of the prepolymers is carried out in a solution thereof in the inert solvent.

In the reaction for the preparation of the thermoplastic polyurethane resin, an organometallic compound such as an organotin compound, e.g., stannous octylate, dibutyltin dilaurate or the like or a tertiary amine, e.g., N-methylmorpholine, triethylamine or the like may be added as a catalyst. In order to increase the stability of a product, an antioxidant, a ultraviolet ray absorbing agent, a hydrolysis preventive agent or the like may be added in an amount of about 5% or less with respect to solids.

The thermoplastic polyurethane resins as prepared by the methods mentioned hereinabove may be used for a binder component as a cured material obtainable by the reaction thereof with a polyisocyanate type curing agent.

The polyisocyanate type curing agent may include, for example, an aliphatic polyisocyanate, an aromatic polyisocyanate or the like. The aliphatic polyisocyanate may be enumerated by, for example, hexamethylene diisocyanate, isophorone diisocyanate, dicyclohexylmethane diisocyanate and methylcyclohexane diisocyanate. The aromatic polyisocyanate may be enumerated by, for example, tolylene diisocyanate (2,4- and/or 2,6- isomers), diphenylmethane diisocyanate, ditolylene diisocyanate, naphthalene diisocyanate (for example, 1,5-naphthalene diisocyanate), dianisidine diisocyanate, xylylene diisocyanate, tris(isocyanate phenyl)thiophosphate, triphenylmethane tricyanate and a polynuclear polyisocyanate.

Among those polyisocyanates enumerated hereinabove, the diisocyanates also may be used as the organic diisocyanate (C) to be used as a component of the thermoplastic polyurethane resin.

A binder component which may be employed with the thermoplastic polyurethane resin and/or with that cured with the polyisocyanate may include, for example, a nitrocellulose, a vinyl chloride resin, a polyvinyl butyral, a bisphenol A type polyether, a vinyl chloride-hydroxy carboxylate copolymer or the like.

The nitrocellulose may be preferably employed which has a nitrogen amount in a range from about 10 to 13%. The amount of the nitrocellulose may preferably range from about 10 to 60% by weight based on the total amount of the binder. Where the amount of the nitrocellulose is too small, surface properties on a magnetic tape cannot be improved to a great extent. Where the amount thereof is rendered too large, there is a risk that an anti-wear property is decreased.

The vinyl chloride resin may be a hard copolymer containing a vinyl alcohol component in a range from more than about 5% by weight, preferably from about 10 to 20% by weight based on the total weight of the binder. The vinyl chloride resin also may contain a copolymerizable monomer such as an aliphatic acid vinyl ester, e.g., vinyl acetate, vinyl propionate or the like, or an unsaturated aliphatic acid, e.g., acrylic acid, methacrylic acid, methyl methacrylate or the like. The vinyl chloride resin may be enumerated, for example, by vinyl chloride-vinyl alcohol copolymer, vinyl chloride-vinyl acetate-vinyl alcohol copolymer, vinyl chloride-vinyl propionate-vinyl alcohol copolymer, vinyl chloride-vinyl acetate-methyl methacrylate-vinyl alcohol copolymer or the like. Where the content of the vinyl alcohol component is too small, there is a tendency that a dispersibility therein of magnetic or magnetizable powders or particles is impaired. Where the content thereof is too large, the binder is rendered too hygroscopic.

The polyvinyl butyral may be obtainable by the condensation reaction of a polyvinyl alcohol with butyl aldehyde. The polyvinyl butyral to be used in accordance with the present invention may have usually a polymerization degree in a range from about 100 to 2,000 and a butylation degree in a range from about 55 to 80 mmol. It is advantageous to use the polyvinyl butyral in an amount ranging from about 25 to 75% by weight based on the total weight of the binder. Where the amount of the polyvinyl butyral is too small, the effect of addition of the polyvinyl butyral cannot be achieved. Where the amount thereof is too large, an elongation at break becomes smaller than 5% necessary for practical application and the coating becomes too brittle.

The bisphenol A type polyether may be obtained, for example, by the reaction of a bisphenol A with an alkylene oxide halogenide in the presence of an alkali such as sodium hydroxide. The bisphenol A may be enumerated by 2,2-bis-(4'-oxyphenyl)propane or a derivative thereof. The alkylene oxide halogenide may include, for example, epichlorohydrin, 1-chloro-2-methyl-2,3-epoxypropane or the like. A saturated aliphatic dicarboxylic acid such as glutaric acid, adipic acid, pimelic acid, suberic acid, azelaic acid, sebacic acid or the like or any other dicarboxylic acid may be added as necessary. The epoxy group or epoxy groups at the terminal or terminals may be open. The amount of the bisphenol A type polyether may be in a range from about 25 to 75% by weight based on the total amount of the binder. Where the amount of the polyether is too large, there is a risk that the adhesive strength of a coating layer to be formed on a non-magnetic supporting base material is decreased. Where the amount thereof is too small, the friction coefficient of the coating layer does not become sufficiently low.

The vinyl chloride-hydroxy carboxylate copolymer may be a compound represented by formula:

(where
$R_5$ is hydrogen atom or methyl group;
t is an integer from about 200 to 800;
u is an integer from about 10 to 250; and
w is an integer from 2 to 4).

The amount of the copolymer may be in a range from about 20 to 80% by weight based on the total amount of the binder.

The binder containing the binder components as hereinabove mentioned may be used in a magnetic layer or a back coat or any other layer on magnetic recording media in accordance with the present invention.

Magnetic or magnetizable powders or particles to be employed may include, for example, gamma-$Fe_2O_3$, $Fe_3O_4$, a mixture of gamma-$Fe_2O_3$ with $Fe_3O_4$, cobalt-doped gamma-$Fe_2O_3$ or $Fe_3O_4$, $CrO_2$, barium ferrite, Berthollide compound or ferromagnetic alloy particles such as Fe-Co, Co-Ni, Fe-Co-Ni, Fe-Co-B, Fe-Co-Cr-B, Mn-Bi, Mn-Al or Fe-Co-V, iron nitride or the like.

In the magnetic layer to be formed on a base material, there may be contained an enforcement such as aluminum oxide, chromium oxide, silicon oxide or the like; a lubricant such as squalane; an antistatic agent such as carbon black; or a dispersing agent such as lecithin or olive oil.

The magnetic or magnetizable particles or powders may be used to prepare a magnetic paint by dissolving them in a solvent such as a ketone such as acetone, methyl ethyl ketone, methyl isobutyl ketone, cyclohexanone or the like; an alcohol such as methanol, ethanol, propanol, butanol or the like; an ester such as methyl acetate, ethyl acetate, butyl acetate, ethyl lactate, glycol acetate, monoethyl ether or the like; a glycol ether such as ethylene glycol dimethyl ether, ethylene glycol monoethyl ether, dioxane or the like; an aromatic hydrocarbon such as benzene, toluene, oxylene or the like;

an aliphatic hydrocarbon such as hexane, heptane or the like; a substituted aliphatic hydrocarbon such as nitropropane or the like.

A supporting base material on which the magnetic paint is coated may be non-magnetic and may include, for example, a polyester such as polyethylene terephthalate or the like, a polyolefin such as polypropylene or the like, a cellulose derivative such as cellulose diacetate, cellulose triacetate, nitrocellulose or the like, a polycarbonate, a polyvinyl chloride, a polyimide, a polyamide, a polyhydrazide, a metal such as aluminum, copper or the like, paper or the like.

The back coat may contain, for example, a lubricant such as carbon such as furnace carbon, channel carbon, acetylene carbon, thermal carbon, lump carbon or the like; an organic pigment such as gamma-Fe-OOH, alpha-$Fe_2O_3$, $Cr_2O_3$, $TiO_2$, ZnO, SiO, $SiO_2$-$2H_2O$, $Al_2O_3$-$2H_2O$, $Al_2O_3$-$2SiO_2$-$2H_2O$, $3MgO$-$4SiO_2$-$H_2O$, $MgCO_3$-$Mg(OH)_2$-$3H_2O$, $Al_2O_3$, $Sb_2O_3$ or the like.

The present invention will be described more in detail.

SYNTHESIS EXAMPLE 1

A 5,000-ml reaction vessel equipped with a stirring propeller, a thermometer and a condenser was charged with 1,000 grams (0.5 mole) of ethylene adipate having a molecular weight of 2,000 and 217.5 grams (1.25 moles) of tolylene diisocyanate ("T-80"; manufactured and solid by Nippon Polyurethane Kogyo K.K.), and the mixture was reacted at 80° to 90° C. for 3 hours. To the mixture were then added 1,200 grams of methyl ethyl ketone, 900 grams of toluene and 71.4 grams (0.78 mole) of glycerine and 0.1 gram of dibutyltin dilaurate, and the chain prolongation was effected at 60° to 70° C. To the reaction mixture was added 290 grams of methyl ethyl ketone to give a polyurethane resin solution having a 35% solids, a viscosity of 17,600 cp/25° C. and an OH value of 0.60 mmol/gram.

SYNTHESIS EXAMPLE 2

To a mixture of 1,250 grams (1.00 mole) of polycaprolactone diol having a molecular weight of 1,250 and 104.2 grams (1.00 mole) of neopentyl glycol were added 571 grams (2.28 moles) of 4,4'-diphenylmethane diisocyanate and 1,040 grams of toluene, and the mixture was reacted at 80° to 90° C. for 4 hours. After 1,000 grams of methyl ethyl ketone and 36.8 grams (0.40 mole) of glycerine were added thereto, the reaction was carried out at 70° C., and 1,600 grams of methyl ethyl ketone was further added to give a solution containing a 35% solids content. The polyurethane resin solution had a viscosity of 10,000 cp/25° C. and an OH value of 0.20 mmol/gram.

SYNTHESIS EXAMPLE 3

A mixture of 1,000 grams (0.50 mole) of polycaprolactone diol having a molecular weight of 2,000, 90 grams (0.10 mole) of 1,4-butylene glycol, 146.2 grams (0.87 mole) of 1,6-hexamethylene diisocyanate, 824 grams of toluene and 0.1 gram of a urethanation catalyst was reacted at 90°–95° C. for 3 hours. After 824 grams of methyl ethyl ketone and 27.6 grams (0.30 mole) of glycerine were added thereto, the mixture was then reacted at 70°–80° C., and 550 grams of methyl ethyl ketone was further added. The resulting polyurethane resin solution had a 35% solids content, a viscosity of 12,000 cp/25° C., a number average molecular weight of 60,000, a weight average molecular weight of 140,000 and an OH value of 0.25 mmol/gram.

SYNTHESIS EXAMPLE 4

There were charged 1,000 grams (0.50 mole) of butylene adipate having a molecular weight of 2,000 and 250.3 grams (1.00 mole) of 4,4'-diphenylmethane diisocyanate into a reaction vessel as used in Example 1, and the mixture was reacted at 80°–90° C. for 3 hours. After 1,335 grams of methyl ethyl ketone, 84.8 grams (0.52 mole) of N-isopropanol diethanolamine and 0.1 gram of dibutyltin dilaurate as a urethanating catalyst were added thereto, the mixture was reacted at 60°–70° C. followed by the addition of 1,145 grams of methyl ethyl ketone to give a polyurethane resin solution having a 35% solids content, a viscosity of 26,000 cp/25° C., an OH value of 0.39 mmol/gram and a tertiary amino group content of 0.39 mmol/gram.

SYNTHESIS EXAMPLE 5

The procedures of Synthesis Example 4 were followed with the exception that 1,250 grams of hexane adipate having a molecular weight of 2,500, 243.6 grams (1.45 moles) of 1,6-hexamethylene diisocyanate and 192.4 grams (1.18 moles) of N-isopropanol diethanolamine were used to give a polyurethane resin solution having a viscosity of 5,400 cp/25° C., a number average molecular weight of 50,000, a weight average molecular weight of 90,000, an OH value of 0.76 mmol/gram and a tertiary amino group content of 0.76 mmol/gram.

SYNTHESIS EXAMPLES 6 AND 7

The procedures of Synthesis Example 4 were followed by varying the composition of the raw materials to give a polyurethane resin solution having the following OH values:

TABLE 2

| Synthesis Example | OH values (mmol/gram) |
|---|---|
| 4 | 0.39 |
| 5 | 0.76 |
| 6 | 0.20 |
| 7 | 0.04 |

SYNTHESIS EXAMPLES 8 THROUGH 11

The polyurethane resin solutions having the compositions as indicated in Table 3 below were prepared in the same manner as in Synthesis Example 4.

TABLE 3

| | Molar Ratios of Raw Materials | | | | Properties | | | |
|---|---|---|---|---|---|---|---|---|
| | Long chain diol (A) | Short chain diol (B) | Organic diisocyanate (C) | Short chain triol (D) | Solids (%) | Viscosity (cp/25° C.) | Solvent (cp/25° C.) | OH value Ratio (wt.) |
| Example 8 | DEA-25000 1.00 mole | 1,4-BG 0.50 mole | MDI 2.00 moles | Glycerine 0.51 mole | 30 | 56000 | $\frac{T}{M} = \frac{20}{80}$ | 0.16 |
| Example 9 | BA-2000 1.00 mole | — | HDI 1.30 moles | Glycerine 0.33 mole | 30 | 9400 | $\frac{T}{M} = \frac{25}{75}$ | 0.15 |

TABLE 3-continued

| | Molar Ratios of Raw Materials | | | | Properties | | | |
|---|---|---|---|---|---|---|---|---|
| | Long chain diol (A) | Short chain diol (B) | Organic diisocyanate (C) | Short chain triol (D) | Solids (%) | Viscosity (cp/25° C.) | Solvent (cp/25° C.) | OH value Ratio (wt.) |
| Example 10 | BA-2400 1.00 mole | 1.4-BG 0.21 mole | HDI 1.50 moles | Glycerine 0.33 mole | 30 | 11000 | $\frac{T}{M} = \frac{30}{70}$ | 0.11 |
| Example 11 | BA-1000 1.00 mole | — | T-80 1.30 moles | Glycerine 0.35 mole | 35 | 11000 | M | 0.28 |

DEA: Dibutylene adipate
BA: Butylene adipate
1.4-BG: 1,4-Butylene glycol
MDI: 4,4'-Diphenylmethane diisocyanate
HDI: 1,6-Hexamethylene diisocyanate
T-80: Tolylene diisocyanate (2.4-/2.6-isomers = 80/20)
T: Toluene
M: Methyl ethyl ketone

COMPARATIVE SYNTHESIS EXAMPLE 1

The procedures of Synthesis Example 4 were followed with the exception that, in place of N-isopropanoldiethanol amine, a mixture of butylene adipate and 4,4'-diphenylmethane diisocyanate was used to give a polyurethane resin solution having a 35% solids content, a viscosity of 9,000 cp/25° C., a number average molecular weight of 50,000 and a weight average molecular weight of 105,000.

COMPARATIVE SYNTHESIS EXAMPLE 2

Synthesis Example 2 was followed with the exception that, in place of glycerine, a mixture of 0.50 mole of polycaprolactone diol having a molecular weight of 1,250, 0.50 mole of neopentyl glycol and 4,4'-diphenylmethane diisocyanate was used to give a polyurethane resin solution having a 35% solids content and a viscosity of 15,000 cp/25° C.

COMPARATIVE SYNTHESIS EXAMPLE 3

Synthesis Example 10 was followed with the exception that, in place of glycerine, a mixture of butylene adipate having a molecular weight of 2,400, 1,4-butylene glycol and 1,6-hexamethylene diisocyanate was used to give a polyurethane resin solution having a 30% solids content and a viscosity of 15,000 cp/25° C.

COMPARATIVE SYNTHESIS EXAMPLE 4

Synthesis Example 9 was followed with the exception that the product was prepared without the use of glycerine to give a polyurethane resin solution having a 30% solids content and a viscosity of 12,000 cp/25° C.

EXAMPLE 1

A magnetic paint having the following composition was prepared:

| Composition | Amount (parts by weight) |
|---|---|
| gamma-Fe$_2$O$_3$(H$_c$ = 390 Oe, $\sigma_s$ = 75 emu/g) | 100 |
| Thermoplastic polyurethane resin of Synthesis Example 1 | 25 (solids) |
| Olive Oil | 1 |
| Solvent (methyl ethyl ketone/methyl isobutyl ketone/toluene = 2/1/1) | 200 |

The mixture having the above composition was ball milled for 48 hours, and the mixture was mixed with 5 parts by weight of a polyisocyanate compound ("Coronate L"; Nippon Polyurethane Kogyo K.K.) as a curing agent. The mixture was mixed for 30 minutes and coated on a polyethylene terephthalate film having a thickness of 12 microns so as to give a coating having a dry thickness of 6.5 microns. After dried, the film was cut into 3.8 mm wide magnetic tapes.

In the same manner, a magnetic tape was prepared without using the curing agent.

EXAMPLE 2 THROUGH 7

The procedures of Example 1 were followed with the exception that, in place of the thermoplastic polyurethane resin of Synthesis Example 1, the polyurethane resins of Synthesis Examples 2 through 7 were respectively employed. The magnetic tapes were also manufactured in the same manner as in Example 1.

In the Examples 2, 5, and 6, magnetic tapes were also prepared without using any curing agent.

COMPARATIVE EXAMPLES 1 AND 2

The procedures of Example 1 were followed with the exception that, in place of the polyurethane resin of Synthesis Example 1, the thermoplastic polyurethane resins of Comparative Synthesis Examples 1 and 2 were employed, respectively.

The magnetic tapes thus obtained were measured for their magnetic performance, gloss, amount of powders rubbed-off and solvent resistance. The results are shown in Table 4 below.

Table 5 shows a comparison of properties between the magnetic layer prior to the curing with the curing agent and the subsequent to the curing therewith.

TABLE 4

| Examples | Curing Agent | Br (Gauss) | Rs (%) | Gloss[1] | Amount of[2] Rubbed-off Powders | solvent[3] Resistance |
|---|---|---|---|---|---|---|
| 1 | None | 1,113 | 80.9 | 74 | −1.5 | — |
| | Used | 1,206 | 82.9 | 80 | −0.5 | over 100 |
| 2 | None | 1,288 | 81.9 | 83 | −0.5 | — |
| | Used | 1,297 | 83.8 | 85.8 | −0.3 | over 100 |
| 5 | None | 1,121 | 78.9 | 62.3 | −1.0 | — |
| | Used | 1,260 | 81.2 | 55 | −0.5 | over 100 |
| 6 | None | 1,287 | 85.3 | 76.5 | −1.5 | — |
| | Used | 1.287 | 85 | 79 | −0.5 | over 100 |

Note:
[1]Gloss is measured on a glossmeter and expressed in % as reflectivity.
[2]The amount of rubbed-off powders was observed for the amounts thereof from pinch rollers, capstans, guid heads and the like when a tape to be tested were travelled, and the results are rated from 0 to −5.0.
[3]Solvent resistance was determined as a number of rubbings on a tape to be tested with a gause containing methyl ethyl ketone.

TABLE 5

| | Prior to Curing | | Subsequent to Curing | | | | |
|---|---|---|---|---|---|---|---|
| | Amount of Rubbed-off Powders | Gloss | Amount of Rubbed-off Powders | Gloss | Br (Gauss) | Rs (%) | Solvent Resistance |
| Example 1 | 0.5 | 47 | −0.5 | 47 | 1,173 | 77.7 | over 100 |
| Comparative Example 1 | −5.0 | 5 | −3.0 | 18 | 682 | 61.4 | 19 |
| Example 3 | −1.0 | 3 | −1.0 | 5 | 764 | 68.3 | over 100 |
| Comparative Example 2 | −5.0 | 4 | −3.0 | 7 | 652 | 59.0 | 35 |
| Example 4 | −1.0 | 28 | −1.0 | 63 | 1,013 | 71.4 | over 100 |
| Example 7 | −2.0 | 8 | −1.0 | 28 | 888 | 76.7 | over 100 |

EXAMPLE 8

A magnetic paint having the following composition was prepared:

| Composition | Amount (parts by weight) |
|---|---|
| gamma-$Fe_2O_3$ ($H_c$ = 390 Oe, $\sigma_s$ = 75 emu/g) | 100 |
| Thermoplastic polyurethane resin of Synthesis Example 1 | 12.5 |
| Nitrocellulose ("H ½"; Asahi Chemical Industry Co., Ltd.) | 12.5 |
| Polyisocyanate ("Desmodur L"; Bayer AG) | 2.5 |
| Olive oil | 1 |
| Solvent (methyl ethyl ketone/methyl isobutyl ketone/toluene = 2/1/1) | 220 |

The mixture having the above composition was treated in the same manner as in Example 1 to give a magnetic tape.

The resultant magnetic tape had: Bm=1,481 Gauss; Rs=78.4%; amount of rubbed-off powders, −0.75; and gloss, 68%.

Figure 1:
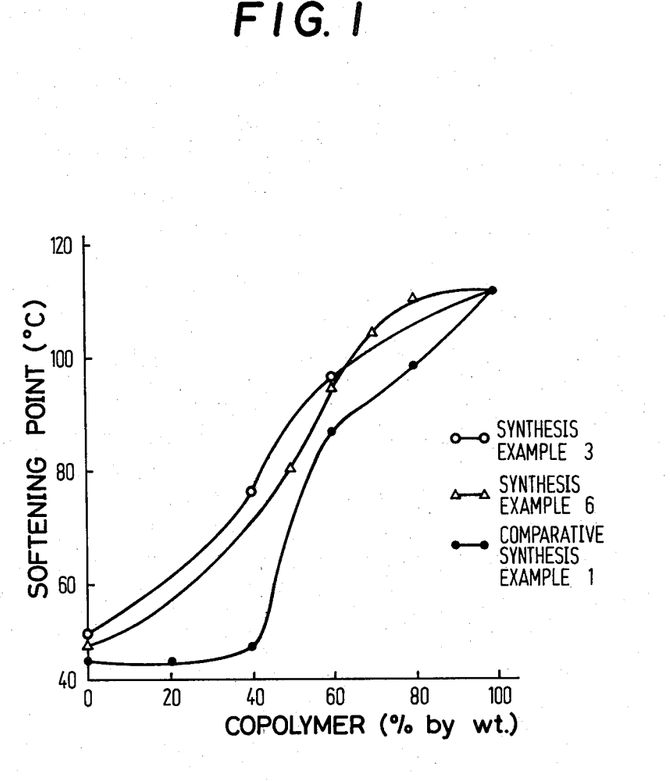
FIG. 1 is a graph illustrating the relationship of the softening points of the polyurethane resins obtained in Examples 3 and 6 and in Comparative Example 1 vs. amounts of vinyl chloride-vinyl acetate-vinyl alcohol copolymer ("VAGH").
Figure 2:
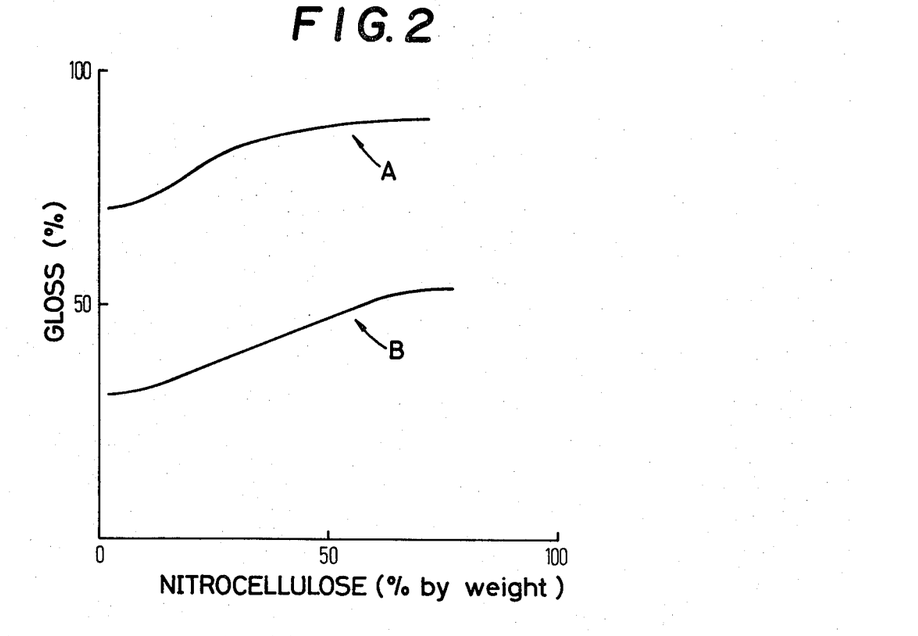
FIG. 2 is the graph illustrating a variation of gloss with varying compositions of binders comprising a polyurethane resin and a nitrocelluloze.

By varying amounts of the nitrocellulose, magnetic tapes were prepared likewise to measure their gloss and a degree of amounts of rubbed-off powders. The results are shown in FIGS. 2 and 3, respectively, in which the magnetic tapes obtained according to Example 8 are shown as a curved line A.

COMPARATIVE EXAMPLE 3

Example 8 was followed with the exception that, in place of the polyurethane resin used therein, the thermoplastic polyurethane resin of Comparative Synthesis Example 1 was used.

Figure 3:
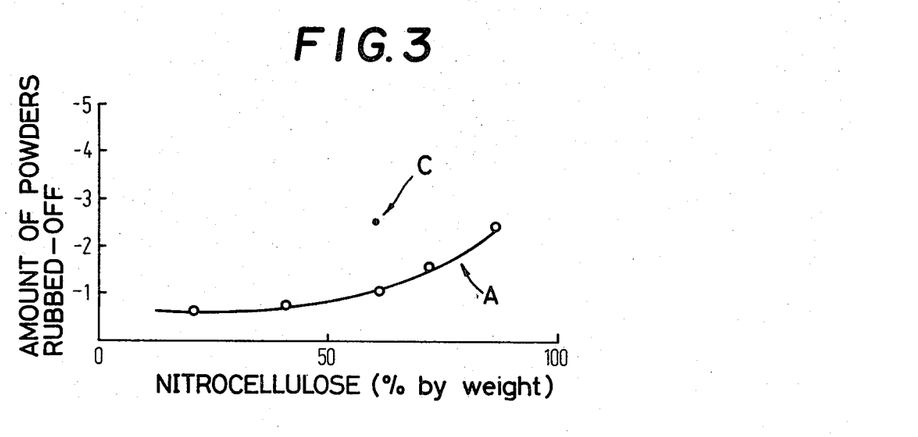
FIG. 3 is the graph illustrating a variation in amounts of powders rubbed-off with varying compositions of binders used in FIG. 2.

The resulting magnetic tape was measured for its degree of amounts of rubbed-off powders, and the result is shown in FIG. 3 as a point C.

Likewise, magnetic tapes were prepared by varying amounts of the nitrocellulose used therein.

The magnetic tapes obtained hereinabove were measured for their gloss, and they gave the results shown in FIG. 2 as a curved line B.

EXAMPLES 9 THROUGH 12

Magnetic tapes were prepared by following Example 8 with the exception that, in place of the polyurethane resin used therein, the thermoplastic polyurethane resin prepared in Synthesis Examples 2 through 5, respectively, were used.

It was found that these tapes also showed substantially the same performance as the tape obtained in Example 8.

EXAMPLE 13

Example 8 was followed with the exception that, in place of nitrocellulose used therein, polyvinyl butyral ("BLS"; Sekisui Chemical Co., Ltd.) was used.

The mixture was treated in substantially the same manner as in Example 8 to give a coating layer having a thickness of 6.5 microns on a 12 micron thick polyethylene terephthalate film and then cut into 3.8 mm wide tapes. The resulting magnetic tape had: Bm=1,445 Gauss; Rs=77%; amount of rubbed-off powders, −1.0; and gloss, 52%.

Figure 6:
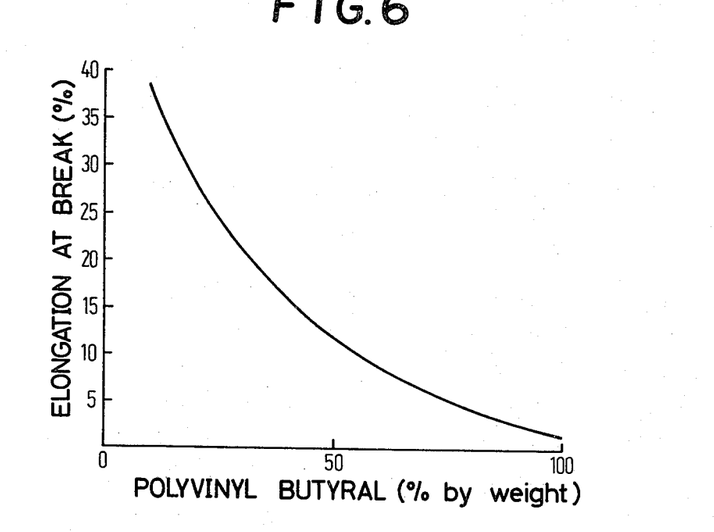

The magnetic tape was also measured for its elongation at break, and the result is shown in FIG. 6.

Figure 5:
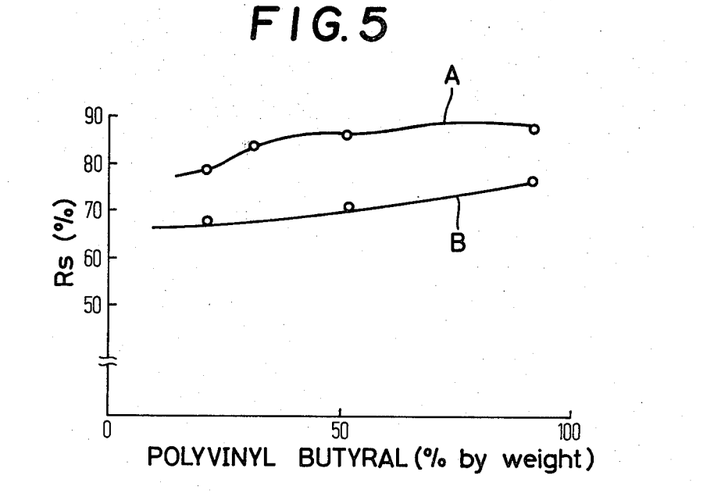
FIGS. 5 and 6 are graphs illustrating variations in Rs(%) and elongation at break, respectively, with varying compositions of binders containing a polyvinyl butyral.

By varying amounts of the polyvinyl butyral to be used, magnetic tapes were likewise prepared. The Rs ratios (%) of these tapes are shown in FIG. 5 as a curved line A.

COMPARATIVE EXAMPLE 4

Example 13 was followed with the exception that, in place of the polyurethane resin used therein, the polyurethane resin obtained in Comparative Synthesis Example 1 was used.

Likewise, magnetic tapes were prepared by varying amounts of the polyvinyl butyral resins to be used. The Rs ratios (%) of the tapes are also shown in FIG. 5 as curved lines B.

EXAMPLES 14 THOUGH 17

The procedures of Example 13 were followed with the exception that the polyurethane resins obtained in Synthesis Examples 2 through 5, respectively, were used in place of the polyurethane resin used in Example 13.

It was found that these tapes showed substantially the same results as shown by the tape obtained in Example 13.

A magnetic paint was prepared by following the procedures and the composition used in Example 13 with the exception that a vinyl chloride-vinyl propionate-vinyl alcohol copolymer (polyvinyl alcohol content, 10%) was used in the amount of 12.5 parts by weight, in place of the polyvinyl butyral used in Example 13.

The resulting magnetic paint was treated in substantially the same manner as in Example 13 to give a magnetic tape.

The magnetic tape was found to have: Bm=1,480 Gauss; Rs (Br/Bm)=83.0%; a degree of the amounts of rubbed-off powders, −0.5; and gloss, 80%.

EXAMPLE 19

A magnetic tape was prepared by following the procedures of Example 18 with the exception that, in place of the copolymer used therein, a vinyl chloride-vinyl acetate-vinyl alcohol copolymer ("VAGH"; Union Carbide Corp.; vinyl alcohol content, 6%) was used.

The magnetic tape was found to have: Bm=1,450 Gauss; Rs=78.5%; a degree of amount of rubbed-off powders, −0.5; and gloss, 76%.

EXAMPLE 20

A magnetic tape was prepared by following the procedures of Example 18 with the exception that, in place of the copolymer used therein, a vinyl chloride-vinyl acetate-vinyl alcohol copolymer (vinyl alcohol content, 12.5%) was used.

The magnetic tape was found to have: Bm=1,473 Gauss; Rs=81.0%, a degree of amount of rubbed-off powders, −0.5; and gloss, 72%.

EXAMPLES 21 THOUGH 24

The procedures of Example 18 were followed with the exception that, in place of the copolymer used therein, the polyurethane resins obtained in Synthesis Examples 2 through 5, respectively, were used.

The resulting magnetic tapes showed substantially the same results as shown in the tapes obtained in Examples 18 through 20.

EXAMPLES 25 THOUGH 28

The procedures of Examples 18 were followed by varying amounts of the composition of the polyurethane resin used therein and the vinyl chloride series resin used therein.

In Example 25, the composition used had: 10% by weight of the polyurethane resin and 90% by weight of the vinyl chloride resin.

In Example 26, the composition used had: 20% by weight of the polyurethane resin and 80% by weight of the vinyl chloride resin.

In Example 27, the composition used had: 80% by weight of the polyurethane resin and 20% by weight of the vinyl chloride resin.

In Example 28, the composition used had: 90% by weight of the polyurethane resin and 10% by weight of the vinyl chloride resin.

The resulting magnetic tapes were measured for their friction coefficient, degree of amount of rubbed-off powders, and durability as a magnetic tape.

Figure 4:
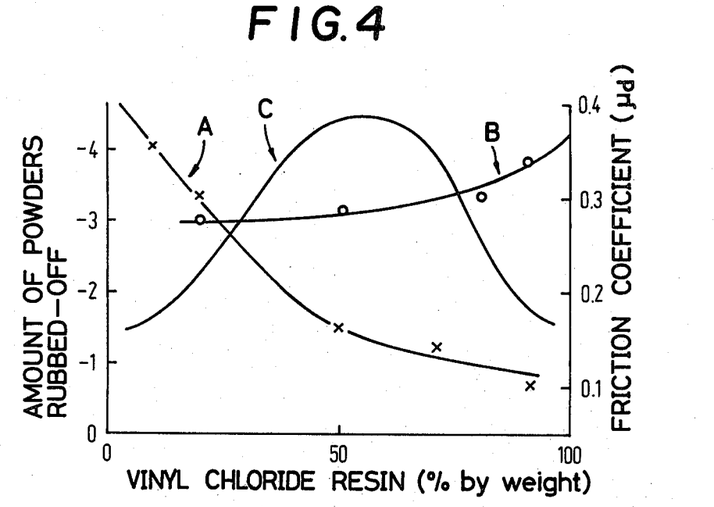
FIG. 4 is a graph illustrating variations in amounts of powders rubbed-off and friction coefficients with varying compositions of binders containing a vinyl chloride resin.

The results are shown in FIG. 4 in which a curved line A shows degrees of amount of rubbed-off powders, a curved line B shows friction coefficients, and a curved line C shows an overall durability of the tape.

EXAMPLE 29

A magnetic paint was prepared by following the procedures and the composition used in Example 13 with the exception that a phenoxy resin ("∓PKHH"; Union Carbide Corp.) was used in the amount of 12.5 parts by weight in place of the polyvinyl butyral used in Example 13.

The resulting magnetic paint was treated in substantially the same manner as in Example 13 to give a magnetic tape.

The magnetic tape was found to have: Bm=1,487 Gauss; Rs=77.5%; a degree of amounts of rubbed-off powders, −0.3; and gloss, 51%.

By varying the composition of the polyurethane resin and the phenoxy resin used herein, magnetic tapes were prepared.

Figure 7:
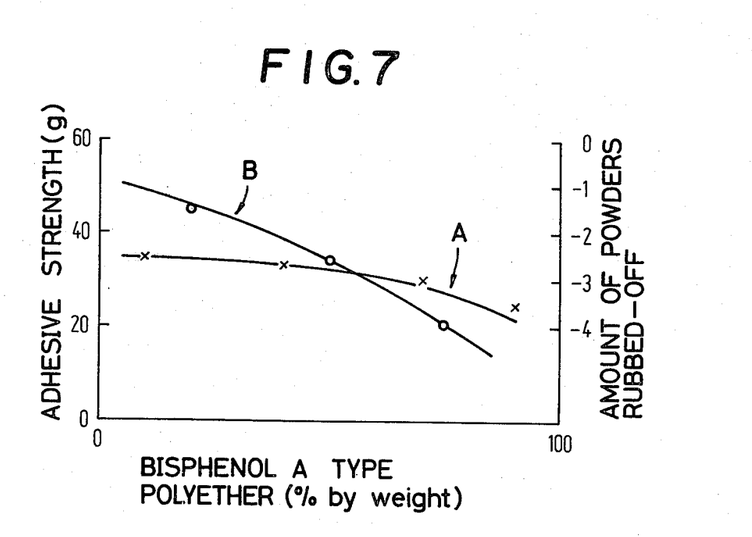
FIG. 7 is a graph illustrating variations in adhesion strength and amounts of powders rubbed-off with varying compositions of binders containing a bisphenol A type polyether.

These magnetic tapes were measured for their adhesive strength and degree of amounts of rubbed-off powders, and the results are shown in FIG. 7 in which curved lines A show degree of amounts of rubbed-off powders and a curved line B shows adhesive strength.

EXAMPLE 30

A magnetic tape was prepared by following the procedures and the composition used in Example 29 with the exception that, in place of the phenoxy resin used therein, an epoxy resin ("Epiclon 353") was used.

The resulting magnetic tape was found to have: Bm=1,454 Gauss; Rs=79.0%; a degree of amounts of rubbed-off powders, −0.5; and gloss, 38%.

EXAMPLES 31 THOUGH 34

The procedures of Example 29 were followed with the exception that, in place of the polyurethane resin used therein, the polyurethane resin obtained in Synthesis Examples 2 through 5, respectively, were used.

The resulting magnetic tapes were found to have substantially the same results as the magnetic tape obtained in Examples 29.

EXAMPLE 35

A magnetic paint having the following composition was prepared:

| Composition | Amount (parts by weight) |
| --- | --- |
| gamma-$Fe_2O_3$ | 100 |
| Vinyl chloride/2-hydroxyethyl methacrylate copolymer (80/20) | 17.5 |
| Thermoplastic polyurethane resin of Synthesis Example 1 | 75 (Solids) |
| Polyisocyanate curing agent ("Desmodur L"; Bayer AG) | 2.5 |
| Solvent (methyl ethyl ketone/methyl isobutyl ketone/toluene = 2/1/1) | 220 |

The mixture having the above composition was treated in the same manner as in Example 1 and coated on a 12 micron thick polyester terephthalate film so as to to give a coating layer having a dry thickness of 6.5 microns. After calendering, the film was cut into 3.81 mm wide tapes.

EXAMPLE 36

The procedures of Example 35 were followed with the exception that, in place of the copolymer used therein, a vinyl chloride/2-hydroxyethly acrylate (80/20% by weight) was used.

COMPARATIVE EXAMPLE 5

The procedures of Example 35 were followed with the exception that, in place of the thermoplastic polyurethane resin used therein, a thermoplastic polyurethane resin prepared from butylene adipate having a molecular weight of 2,000 and 4,4'-diphenylmethane diisocyanate in substantially the same manner as in Synthesis Example 1 except for no use of N-isopropanol diethanolamine. A solution resulting from the polyurethane resin had a 35% solids content, a viscosity of 9,000 cp/25° C., a number average molecular weight of 50,000 and a weight average molecular weight of 105,000.

COMPARATIVE EXAMPLE 6

The procedures of Example 35 were followed with the exception that, in place of the polyurethane resin used therein, a thermoplastic polyurethane resin ("Estan 5702"; B. F. Goodrich & Co.; no active OH goup) was used.

The magnetic tapes prepared in Examples 35 and 36 and in Comparative Examples 5 and 6 were each measured for their magnetic performance and physical properties. The results are shown in Table 6.

TABLE 6

|  | Bm (Gauss) | Br/Bm (%) | Output (300 Hz) | Output (10 kHz) | Amounts of Rubbed-Off Powder | Output Variation (7 KHz) |
|---|---|---|---|---|---|---|
| Example 35 | 1,750 | 0.89 | +2.5 dB | +4 dB | −0.5 | −1.0 dB |
| Example 36 | 1,760 | 0.89 | +2.5 dB | +4 dB | −0.5 | −1.0 dB |
| Comparative Example 5 | 1,670 | 0.87 | +2.0 dB | +3 dB | −1.0 | −1.5 dB |
| Comparative Example 6 | 1,420 | 0.87 | 0 | 0 | −3 | −3 dB |

Note:
An output variation means an output attenuation after 100 runnings on a video tape recorder.

What is claimed is:

1. A magnetic recording medium comprising a non-magnetic supporting material, magnetic or magnetizable particles or powders, and a thermoplastic polyurethane resin comprising a combination of units represented by formulas (I):

$$(\text{W}-\text{OC}-\text{NH}-\text{X}-\text{NH}-\text{CO})_{n_1} \quad (a)$$

$$(\text{Y}-\text{OC}-\text{NH}-\text{X}-\text{NH}-\text{CO})_{n_2} \quad (b)$$
$$\quad | \quad$$
$$\text{OH}$$

$$(\text{Z}-\text{OC}-\text{NH}-\text{X}-\text{NH}-\text{CO})_{n_3} \quad (c)$$

wherein
W is a residue derived by the elimination of the two hydroxyl groups from a long chain diol (A) having a molecular weight in a range of about 500 to 3,000;
X is a residue derived by the elimination of the two isocyanate groups from an organic isocyanate (C);
Y is a residue derived by the elimination of the two hydroxyl groups from the short chain triol (D) having a molecular weight in a range lower than about 500;
Z is a residue derived by a elimination of the two hydroxyl groups from the short chain diol (B) having a molecular weight in a range of about 50 to 500;
$n_1$ and $n_2$ are each a positive integer; and
$n_3$ is 0 or a positive integer;
said short chain triol (D) being represented by the formula (II):

or by the formula (III):

$$\text{HO}-\text{R}_1-\text{N}-\text{R}_2-\text{OH}$$
$$\quad | \quad$$
$$\text{R}_3-\text{OH}$$

wherein
$R_1$ is a group represented by the formula:

$$-(\text{CH}_2)_m(\text{OCH}_2\text{CH}_2)_n-$$

(where m and n are each an integer from 0 to 6, provided that, when one of m and n is 0, the other is an integer other than 0);
$R_2$ is a group represented by the formula:

$$-(\text{CH}_2)_p(\text{OCH}_2\text{CH}_2)_q-$$

(where p and q are each an integer from 0 to 6, provided that, when one of p and q is 0, the other is an integer other than 0);
$R_3$ is a group represented by formula:

$$-(\text{CH}_2)_r\text{CH}-$$
$$\quad | \quad$$
$$\text{CH}_3$$

(where r is an integer from 0 to 3) or a group represented by formula:

$$-(\text{OCH}_2-\text{CH})_r-$$
$$\quad | \quad$$
$$\text{CH}_3$$

(where r has the same meaning as above); and
$R_4$ is a group represented by formula:

$$-\text{C}_s\text{H}_{2s+1}$$

(where s is an integer from 0 to 4);
obtainable by the polyaddition reaction of the long chain diol (A), the organic diisocyanate (C) and the short chain triol (D) and, as desired, the short chain diol (B) in the ratios of:

$$b/a \leq 3 \quad (i)$$

$$1 < c/(a+b) < 3 \quad (ii)$$

$$\tfrac{1}{2} \leq [c-(a+b)]/d < 1 \quad (iii)$$

(wherein
a is a molar number of the long chain diol (A);
b is a molar number of the short chain diol (B);
c is a molar number of the organic diisocyanate (C); and
d is a molar number of the short chain triol (D)).

2. The magnetic recording medium according to claim 1, wherein the thermoplastic polyurethane resin is cured with a polyisocyanate curing agent.

3. The magnetic recording medium according to claim 1, wherein the long chain diol is a polyester diol, a polyether diol or a polyether ester diol.

4. The magnetic recording medium according to claim 3, wherein the polyester diol is obtainable by the reaction of an aliphatic dicarboxylic acid, an aromatic dicarboxylic acid or a lower alcohol ester of the dicarboxylic acid with a glycol.

5. The magnetic recording medium according to claim 4, wherein the aliphatic dicarboxylic acid is succinic acid, adipic acid, sebacic acid or azelaic acid.

6. The magnetic recording medium according to claim 4, wherein the aromatic dicarboxylic acid is terephthalic acid or isophthalic acid.

7. The magnetic recording medium according to claim 4, wherein the lower alcohol ester of dicarboxylic acid is a methyl or ethyl ester.

8. The magnetic recording medium according to claim 4, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol.

9. The magnetic recording medium according to claim 1, wherein the long chain diol is a polyester diol, a polyether diol or a polyether ester glycol.

10. The magnetic recording medium according to claim 9, wherein the polyester diol is obtained by the reaction of an aliphatic dicarboxylic acid, an aromatic dicarboxylic acid or a lower alcohol ester of the dicarboxylic acid with a glycol.

11. The magnetic recording medium according to claim 10, wherein the aliphatic dicarboxylic acid is succinic acid, adipic acid, sebacic acid or azelaic acid.

12. The magnetic recording medium according to claim 10, wherein the aromatic dicarboxylic acid is terephthalic acid or isophthalic acid.

13. The magnetic recording medium according to claim 10, wherein the lower alcohol ester is a methyl or ethyl ester.

14. The magnetic recording medium according to claim 10, wherein the glycol is ethylene glycol, 1,3-propylene glycol, 1,4-butylene glycol, 1,6-hexane glycol, diethylene glycol, neopentyl glycol, or an ethylene oxide or propylene oxide adduct of bisphenol A.

15. The thermoplastic polyurethane resin according to claim 9, wherein the polyether diol is obtained by the cleavage polymerization of a lactone.

16. The magnetic recording medium according to claim 15, wherein the lactone is ε-caprolactone.

17. The magnetic recording medium according to claim 9, wherein the polyether diol is polyether glycol.

18. The magnetic recording medium according to claim 17, wherein the polyether glycol is polyethylene glycol, polypropylene ether glycol or polytetramethylene ether glycol.

19. The magnetic recording medium according to claim 9, wherein the polyether ester glycol is a polyester glycol obtained by the reaction of a polyalkylene ether glycol with an aliphatic dicarboxylic acid or an aromatic dicarboxylic acid.

20. The magnetic recording medium according to claim 19, wherein the polyalkylene ether glycol is polyethylene glycol, polypropylene ether glycol or polytetramethylene ether glycol.

21. The magnetic recording medium according to claim 19, where the aliphatic acid is succinic acid, adipic acid sebacic acid or azelaic acid.

22. The magnetic recording medium according to claim 19, wherein the aromatic acid is terephthalic acid or isophthalic acid.

23. The magnetic recording medium according to claim 1, where the short chain diol (B) is an aliphatic glycol or an aromatic diol.

24. The magnetic recording medium according to claim 23, wherein the aliphatic glycol is ethylene glycol, propylene glycol, 1,4-butylene glycol, 1,6-hexane glycol or neopentyl glycol.

25. The magnetic recording medium according to claim 23, wherein the aromatic glycol is an ethylene oxide or propylene oxide adduct of bisphenol A or an ethylene oxide adduct of hydroquinone.

26. The magnetic recording medium according to claim 1, wherein the organic diisocyanate (C) is an aromatic diisocyanate, an aliphatic diisocyanate or an alicyclic diisocyanate.

27. The magnetic recording medium according to claim 26, wherein the organic diisocyanate (C) is tolylene diisocyanate, 4,4'-diphenylmethane diisocyanate, para-xylene diisocyanate or isophorone diisocyanate.

28. The magnetic recording medium according to claim 1, wherein the short chain triol of the formula (II) is glycerine, an ethylene oxide adduct of glycerine, an ethylene oxide adduct of glycerine ethylene oxide, 2-methylpropane-1,2,3-triol, 4-bis[(2-hydroxyethyl)]-2-hydroxypentane, 3-methylpentane-1,3,5-triol or 1,2,6-hexane triol.

29. The magnetic recording medium according to claim 1, wherein the short chain triol of the formula (III) is 1-bis-(2-hydroxylethyl)amino-2-propanol, propylene oxide adduct of diethanol amine or ethylene oxide adduct of N-isopropanol diethanolamine.

30. The magnetic recording medium according to claim 1, wherein the thermoplastic polyurethane resin is used with a nitrocellulose, a vinyl chloride resin, a polyvinyl butyral, a bisphenol A type polyether or a vinyl chloride-hydroxy carboxylate copolymer.

31. The magnetic recording medium according to claim 30, wherein the nitrocellulose is one having a nitrogen content in a range from about 10 to 13%.

32. The magnetic recording medium according to claim 31, wherein the nitrocellulose is contained in the amount ranging from about 10 to 60% by weight based on the total weight of the binder.

33. The magnetic recording medium according to claim 30, wherein the vinyl chloride resin is a hard copolymer containing a vinyl alcohol component in a range from about more than 5% by weight based on the total weight of the binder.

34. The magnetic recording medium according to claim 33, wherein the vinyl chloride resin comprises a copolymerizable monomer as a component.

35. The magnetic recording medium according to claim 34, wherein the copolymerizable monomer is an aliphatic acid vinyl ester or an unsaturated aliphatic acid.

36. The magnetic recording medium according to claim 35, wherein the unsaturated aliphatic acid is acrylic acid, methacrylic acid or methyl methacrylate.

37. The magnetic recording medium according to claim 35, wherein the aliphatic acid vinyl ester is vinyl acetate or vinyl propionate.

38. The magnetic recording medium according to claim 34, wherein the vinyl chloride resin is vinyl chloride-vinyl alcohol copolymer, vinyl chloride-vinyl acetate-vinyl alcohol copolymer, vinyl chloride-vinyl propionate-vinyl alcohol copolymer or vinyl chloride-vinyl acetate-methyl methacrylate-vinyl alcohol copolymer.

39. The magnetic recording medium according to any one of claim 38, wherein the vinyl chloride resin is contained in the amount of about 10 to 20% by weight based on the total weight of the biner.

40. The magnetic recording medium according to claim 30, wherein the polyvinyl butyral is one obtained by the condensation reaction of a polyvinyl alcohol with butyl aldehyde.

41. The magnetic recording medium according to claim 40, wherein the polyvinyl butyral has a polymerization degree in a range from about 100 to 2,000 and a butylation degree in a range from about 55 to 80 mmol.

42. The magnetic recording medium according to claim 40, wherein the polyvinyl butyral is contained in the amount ranging from about 25 to 75% by weight based on the total weight of the binder.

43. The magnetic recording medium according to claim 30, wherein the bisphenol A type polyether is one obtained by the reaction of a bisphenol A with an alkylene oxide halogenide.

44. The magnetic recording medium according to claim 43, wherein the bisphenol A is 2,2-bis(4-oxyphenyl)propane or a derivative thereof.

45. The magnetic recording medium according to claim 43, wherein the alkylene oxide halogenide is epichlorohydrin or 1-chloro-2-methyl-2,3-epoxypropane.

46. The magnetic recording medium according to claim 45, wherein the bisphenol A type polyether contains an aliphatic saturated dicarboxylic acid.

47. The magnetic recording medium according to claim 46, wherein the aliphatic saturated dicarboxylic acid is glutaric acid, adipic acid, pimelic acid, suberic acid, azelaic acid or sebacic acid.

48. The magnetic recording medium according to claim 43, wherein the bisphenol A type polyether is contained in the amount ranging from about 25 to 75% by weight based on the total weight of the binder.

49. The magnetic recording medium according to claim 30, wherein the vinyl chloride-hydroxy carboxylate copolymer is a copolymer having units represented by formula:

(wherein:
$R_5$ is hydrogen atom or methyl group;
t is an integer from about 200 to 800;
u is an integer from about 10 to 250; and
w is an integer from 2 to 4).

50. The magnetic recording medium according to claim 49, wherein the copolymer is contained in the amount ranging from about 20 to 80% by weight based on the total weight of the binder.

51. The magnetic recording medium according to claim 2, wherein the polyisocyanate is an aliphatic polyisocyanate, an alicyclic polyisocyanate or an aromatic polyisocyanate.

52. The magnetic recording medium according to claim 51, wherein the aliphatic polyisocyanate is hexamethylene diisocyanate.

53. The magnetic recording medium according to claim 51, wherein the alicyclic polyisocyanate is isophorone diisocyanate, dicyclohexylmethane diisocyanate or methylcyclohexane diisocyanate.

54. The magnetic recording medium according to claim 51, wherein the aromatic polyisocyanate is tolylene diisocyanate, diphenylmethane diisocyanate, ditolylene diisocyanate, naphthalane diisocyanate, dianisidine diisocyanate, xylylene diisocyanate, tris(isocyanate phenyl)thiophosphate, triphenylmethane tricyanate or a polynuclear polyisocyanate.

* * * * *